United States Patent [19]

Kriz et al.

[11] Patent Number: 4,535,641

[45] Date of Patent: Aug. 20, 1985

[54] RECIPROCATING PLUNGER FUEL INJECTION PUMP

[75] Inventors: Miroslav Kriz; Kenneth M. Harris, both of London, England

[73] Assignee: Lucas Industries plc, Birmingham, England

[21] Appl. No.: 386,272

[22] Filed: Jun. 8, 1982

[30] Foreign Application Priority Data

Jun. 13, 1981 [GB] United Kingdom ................. 8118238

[51] Int. Cl.[3] ...................... F16H 25/14; F16H 53/06; F04B 7/00

[52] U.S. Cl. ........................................ 74/53; 74/569; 123/90.25

[58] Field of Search ...................... 74/569, 53, 54, 55; 417/490, 498; 123/90.25, 90.26

[56] References Cited

U.S. PATENT DOCUMENTS

| | | | |
|---|---|---|---|
| 1,444,857 | 2/1923 | Taub | 123/90.25 X |
| 3,394,684 | 7/1968 | Stark | 123/90.25 |
| 3,413,965 | 12/1968 | Gavasso | 74/53 X |
| 3,626,469 | 12/1971 | Ashley | 123/90.25 |
| 3,738,180 | 6/1973 | Sola | 74/53 |
| 4,204,814 | 5/1980 | Matzen | 74/569 X |

FOREIGN PATENT DOCUMENTS

| | | | |
|---|---|---|---|
| 1262610 | 4/1961 | France . | |
| 84149 | 6/1954 | Norway | 74/569 |
| 343688 | 2/1931 | United Kingdom | 123/90.25 |
| 809027 | 2/1959 | United Kingdom | 123/90.26 |
| 1217318 | 12/1970 | United Kingdom | 74/55 |

*Primary Examiner*—Rodney H. Bonck

[57] ABSTRACT

A fuel injection pump of the reciprocating plunger type has a plunger having a head engaged by a tappet assembly. The tappet assembly includes a roller engageable with a cam lobe of a cam to impart inward movement to the plunger. Outward movement of the plunger is effected by a lever assembly having a forked end engaging the head and a roller for engagement with a cam lobe.

3 Claims, 5 Drawing Figures

RECIPROCATING PLUNGER FUEL INJECTION PUMP

This invention relates to a reciprocating plunger fuel injection pump of the kind comprising a body defining a bore in which the plunger is mounted, a tappet assembly including a roller for engagement with a rotary cam, said cam having a cam lobe acting to impart movement to the tappet assembly and plunger in one direction to cause fuel to be displaced from said bore and means for effecting movement of the plunger and tappet assembly in the other direction.

The usual practice is to provide a coiled compression spring to return the tappet assembly and plunger. Such a spring must exert a substantial force and the stresses which occur in the spring can be appreciable. In some cases the cam can have a number of lobes so that the operating frequency of the plunger and tappet assembly is increased and this results in an increase of stress in the spring making the spring more liable to failure.

The object of the invention is to provide a pump of the kind specified in a simple and convenient form.

According to the invention a fuel injection pump of the kind specified comprises a lever assembly pivotally mounted in the body and having a forked end for engagement with a head on the plunger, one side of the head being engaged by the tappet assembly and the other side of the head being engaged by said forked end, the lever assembly mounting a roller for engagement with said cam, the arrangement being such that following movement in said one direction by a cam lobe, the plunger and tappet assembly upon continued rotation of the cam are moved in the other direction by said lobe or a further cam lobe.

An example of a pump in accordance with the invention will now be described with reference to the accompanying drawings in which.

Figure 1:
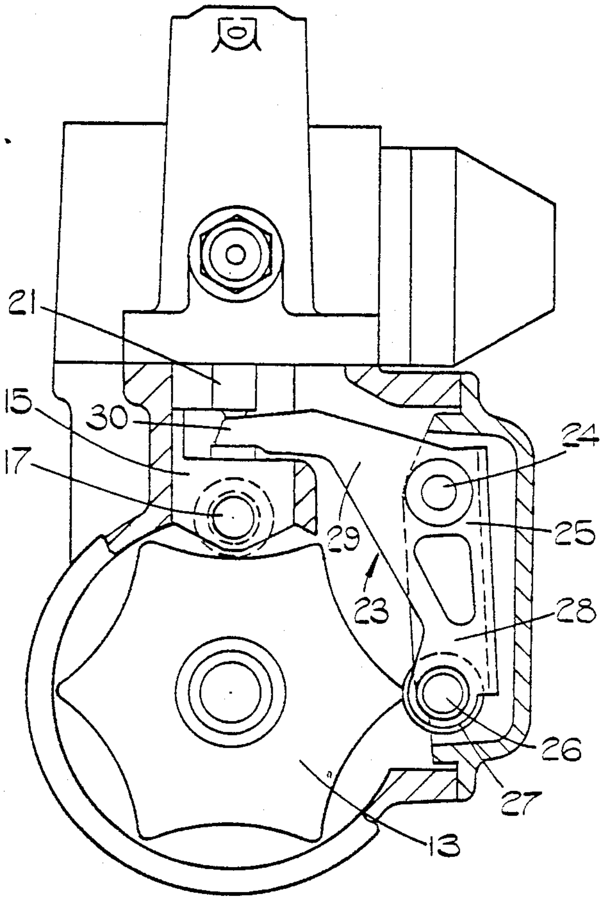
FIG. 1 is a part sectional end elevation of the pump with parts removed for the sake of clarity.
Figure 2:
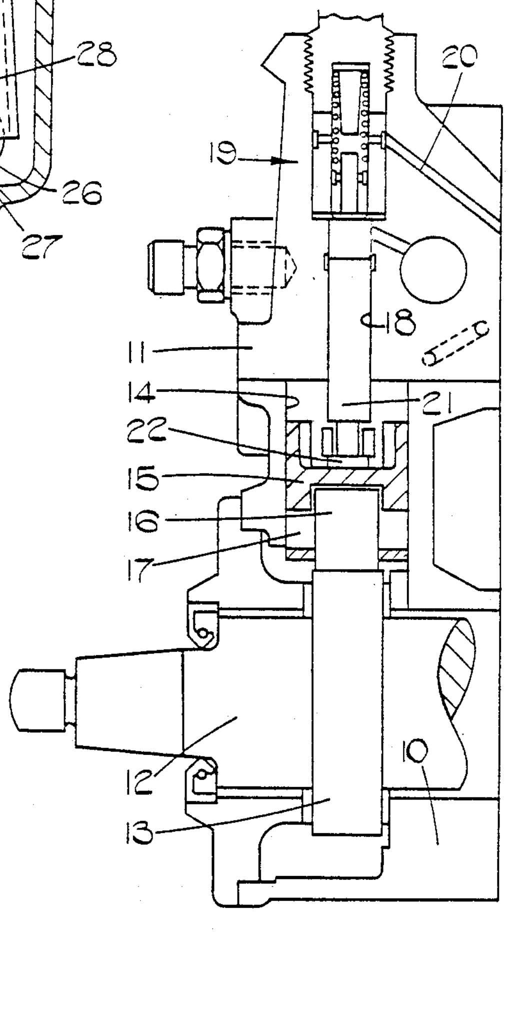
FIG. 2 is a part sectional side elevation of of the pump.
Figure 3:
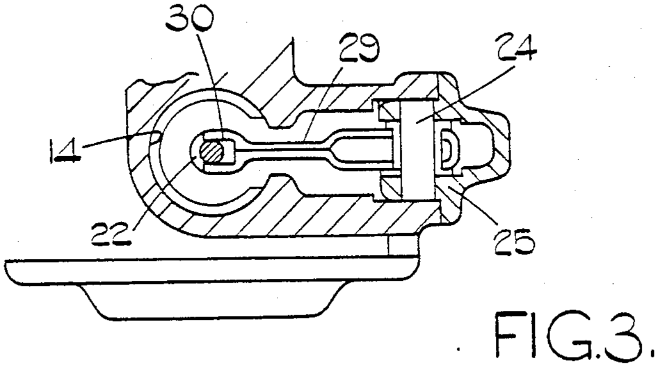
FIG. 3 is a sectional plan view of a portion of the pump seen in FIGS. 1 and 2.

Referring to the drawings the pump comprises a multi-part housing 10, 11, the portion 10 of the housing accommodating a cam shaft 12 which is adapted to be driven in timed relationship with the associated engine. Formed on the cam shaft is a cam 13 which in the particular example, has three pairs of cam lobes. The housing 10 defines a cylindrical bore 14 in which is slidably mounted a tappet assembly which includes a cup-shaped tappet 15, a roller 16 and a pin 17 which extends through the roller into the tappet. The roller 16 in use engages with the cam 13.

In the housing part 11 is defined a plunger bore 18 the end of which remote from the tappet assembly mounts a delivery assembly generally indicated at 19 and which communicates with an outlet passage 20. The passage 20 may be connected to an outlet which in use is connected to a fuel injection nozzle of the associated engine or it may be connected to a fuel distributing device (not shown) which is intended to distribute fuel to a number of injection nozzles of the associated engine.

Located within the plunger bore 18 is a plunger 21 which extends from the bore 18 into the bore 14. The plunger adjacent its end remote from the delivery valve assembly is provided with a circumferential groove which defines at the end of the plunger, a head 22. The face of the head 22 remote from the delivery valve engages a surface of the tappet so that during upward movement of the tappet assembly by a cam lobe, upward movement is imparted to the plunger 21 and fuel flows past the delivery valve assembly 19 to the passage 20.

In order to return the tappet assembly and the plunger following upward movement thereof, there is provided in the housing 10 a lever assembly generally indicated at 23 and which is pivotally mounted by means of a pin 24 on a mounting 25 which is adapted to be secured to the housing part 10. The lever assembly 23 essentially forms a bell crank lever one arm of which mounts pin 26 which carries a roller 27. This arm is indicated by means of the reference numeral 28 and the other arm 29 has a forked end indicated at 30 and which locates against the head 22 of the plunger on the side thereof remote from, the tappet assembly. The lever may be formed by means of a pressing operation, from sheet steel or the like and the housing portion 10 and also the skirt of the tappet 15 are cut away to permit the forked end 30 of the arm 29 to engage with the head.

The roller 27 moves in an arc about the axis of the pin 24 and it will be seen to engage the cam 13 at a position substantially at right angles to the position of engagement of the roller 16. The cam lobes are shaped so that following upward movement of the plunger, the roller 16 can move downwardly and at the same time the roller 27 is moved outwardly to positively move the tappet assembly and also the plunger in the downwards direction. In this way the need for a spring which is the conventional way of returning the tappet assembly and plunger, is avoided. The rollers 16 and 27 together with the linkage, are arranged so that they remain in contact with the surface of the cam as long as possible during the rotation of the cam. The fact that the roller 27 moves in an arc whereas the roller 16 moves in a straight line means that there will be periods during the rotation of the cam during which one or the other of the rollers is out of engagement with the cam.

The pin 24 may be adjustably mounted in the housing for the purpose of adjustment after assembly of the pump. In one example the pin 24 extends with its axis offset, from a cylindrical support portion in the housing.

Figure 4:
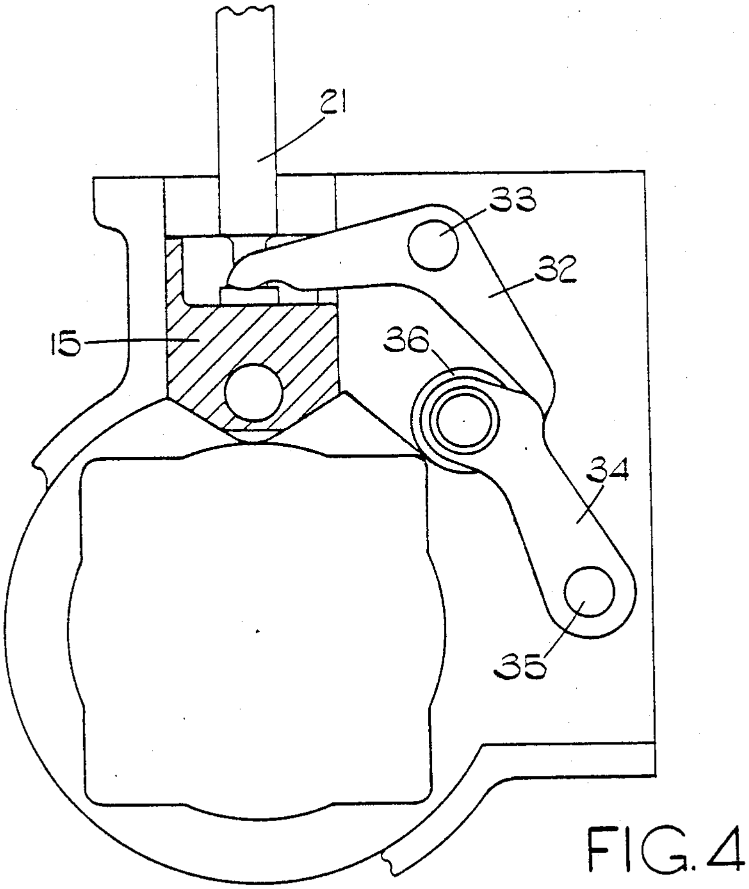
FIG. 4 shows a modified form of mechanism.

In the arrangement shown in FIG. 4 the lever assembly comprises a first lever 32 of bellcrank form. One end of one arm of the lever 32 is forked for engagement with the head 22 and the lever is pivotally mounted about a pin 33. The assembly also includes a second lever 34 mounted about a pin 35. The end of the other arm of the first lever engages the second lever at a position remote from the pin 35 and adjacent this position the lever carries a roller 36 which engages the periphery of the cam. The cam shown in FIG. 4 is intended for supplying fuel to a four cylinder engine.

Figure 5:
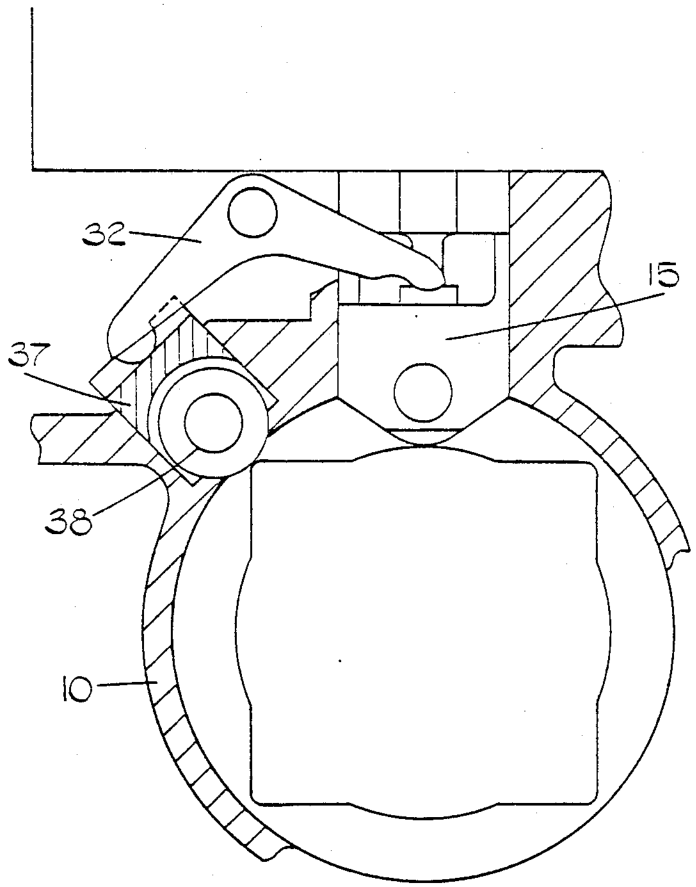
FIG. 5 shows a further modified form of the apparatus.

In the arrangement shown in FIG. 5 the second lever 34 and roller are replaced by a tappet 37 slidably mounted within a bore formed in the housing 10. The tappet mounts a roller 38 for engagement with the periphery of the cam, the cam having in the example, the same form as the cam shown in FIG. 4.

In the example described the tappets are of cylindrical form. They may however be of non-circular section and the rollers may be located in grooves instead of being carried by pins.

We claim:

1. A reciprocating plunger fuel injection pump comprising a body defining a bore in which a plunger is mounted, a tappet assembly including a roller, a rotary cam mounted on a rotary cam shaft, a plurality of equiangularly shaped cam lobes on said cam, said roller co-operating with the cam to impart movement to the tappet assembly and plunger in one direction to cause fuel to be displaced from said bore, a lever assembly pivotally mounted in the body, said lever assembly comprising first and second levers, the first lever being of bellcrank form having a forked end of one arm for engagement with a head on the plunger and the end of the other arm engaging the second lever, one side of the head being engaged by the tappet assembly and the other side of the head being engaged by the forked end, said second lever adjacent its point of contact with the first lever mounting a roller engaging with the cam, the arrangement being such that following movement in said one direction by a cam lobe, the plunger and tappet assembly upon continued rotation of the cam are moved in the other direction by one of said lobes.

2. A pump according to claim 1, in which said tappet assembly includes a cupshaped tappet, the skirt of the tappet being cut away to allow the forked end of the lever to engage the head of the plunger.

3. A pump according to claim 1, in which said lever assembly is formed from sheet material.

* * * * *